United States Patent

Allport

[15] 3,683,259
[45] Aug. 8, 1972

[54] VOLTAGE REGULATORS FOR USE IN BATTERY CHARGING SYSTEMS

[72] Inventor: Maurice James Allport, Stourbridge, Worcestershire, England

[73] Assignee: Joseph Lucas (Industries) Limited, Birmingham, England

[22] Filed: Feb. 18, 1971

[21] Appl. No.: 116,508

[30] Foreign Application Priority Data

March 3, 1970 Great Britain..........10,053/70

[52] U.S. Cl. ..................320/68, 320/35, 322/28
[51] Int. Cl. ..............................................H02j 7/00
[58] Field of Search............320/2, 39, 40, 35, 36, 68; 322/28, 33, 34; 323/68

[56] References Cited

UNITED STATES PATENTS

| | | | |
|---|---|---|---|
| 3,152,298 | 10/1964 | Byles | 323/33 X |
| 3,138,751 | 6/1964 | Brewster | 320/68 |
| 3,447,059 | 5/1969 | Ford et al. | 320/39 X |
| 3,559,026 | 1/1971 | Nolan et al. | 322/028 X |
| 3,522,482 | 8/1970 | Thompson | 322/33 X |
| 3,469,167 | 9/1969 | Wright | 322/28 X |

*Primary Examiner*—J. D. Miller
*Assistant Examiner*—Robert J. Hickey
*Attorney*—Holman & Stern

[57] ABSTRACT

A voltage regulator has an output transistor which controls current flow in the field winding of a generator charging a battery, and a resistance chain for sensing the output voltage of the generator. Connected to the resistance chain is a Zener diode which controls conduction of the output transistor, and a resistance chain includes a thermistor for providing temperature compensation. The thermistor is bridged by the collector-emitter path of a transistor and biasing means is provided for controlling the base voltage of the transistor so that the regulated voltage varies with temperature in a predetermined manner.

4 Claims, 3 Drawing Figures

VOLTAGE REGULATORS FOR USE IN BATTERY CHARGING SYSTEMS

This invention relates to voltage regulators for use in battery charging systems.

A regulator according to the invention includes an output transistor which in use controls current flow in the field winding of a generator charging a battery, a resistance chain for sensing the output voltage of the generator in use, a Zener diode connected to the resistance chain so as to conduct at a predetermined voltage, the Zener diode controlling conduction of the output transistor, said resistance chain including a thermistor for providing temperature compensation, and the thermistor being bridged by the collector-emitter path of a transistor, the regulator further including biasing means for controlling the base voltage of the transistor so that the regulated voltage varies with temperature in a predetermined manner.

In the accompanying drawings.

Figure 1:
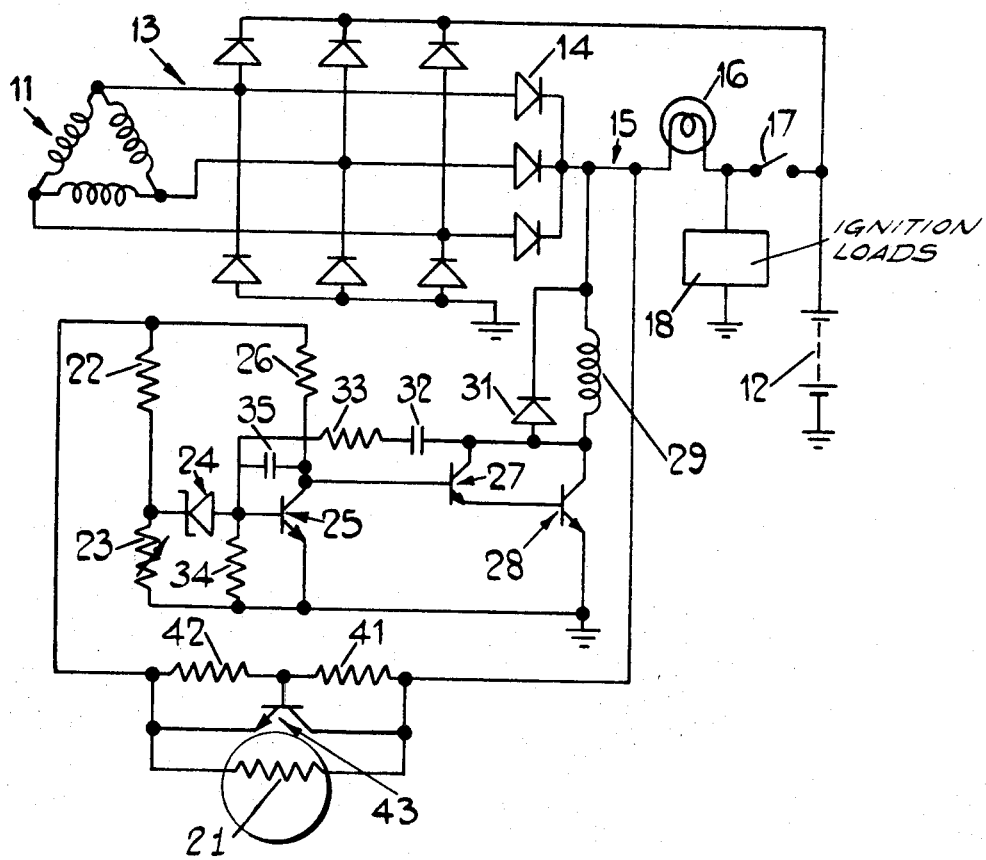
FIG. 1 is a circuit diagram illustrating one example of the invention.

Referring first to FIG. 1, a road vehicle incorporates an alternator 11 driven by the engine of the vehicle, and a battery 12 having its negative terminal earthed. The output from the alternator is fed through a full wave rectifier 13 to the battery 12, and an additional output from the alternator is fed through three diodes 14 to a positive supply line 15 which is connected to the positive terminal of the battery 12 through a warning lamp 16 and the ignition switch 17 of the vehicle in series. The ignition loads 18 of the vehicle are connected to the junction of the lamp 16 and switch 17.

Connected between the line 15 and earth is a resistance chain consisting of a thermistor 21 and a pair of resistors 22, 23 in series. The junction of the resistors 22 and 23 is connected through a Zener diode 24 to the base of an n-p-n transistor 25 the emitter of which is connected to earth and the collector of which is connected to the junction of the thermistor 21 and resistor 22 through a resistor 26. The collector of the transistor 25 is further connected to the base of an n-p-n transistor 27, the emitter of which is connected to the base of an n-p-n transistor 28 having its emitter connected to earth and its collector connected to the line 15 through the field winding 29 of the alternator, the winding 29 being bridged by a diode 31. The collectors of the transistors 27, 28 are interconnected and coupled to the base of the transistors 25 through a capacitor 32 and a resistor 33 in series, and the transistor 25 has its base earthed through a resistor 34 and its base and collector interconnected through a capacitor 35 which minimizes radio interference.

The thermistor 21 is bridged by a pair of resistors 41, 42 in series, and connected to the junction of the resistors 41 and 42 is the base of an n-p-n transistor 43, the collector of which is connected to the junction of the thermistor 21 and resistor 41 and the emitter of which is connected to the junction of the thermistor 21 and resistor 42.

When the ignition switch 17 is closed, current flows by way of the warning lamp 16 and the resistor 26 to turn on the transistors 27 and 28, so that current can flow in the winding 29. At this stage the lamp 16 is illuminated. When the engine of the vehicle has started and the alternator produces an output, current supply to the regulator is maintained through the diodes 14, but the potential on each side of the lamp 16 becomes the same so that the lamp 16 is extinguished. When the voltage between the lines 15 and earth reaches a value sufficient to cause the Zener diode 24 to conduct, current flows to the base-emitter circuit of the transistor 25, so that current flowing through the resistor 26 is diverted from the transistor 27 to the transistor 25, and the transistors 27 and 28 start to turn off. By virtue of the feedback circuit 32, 33 the circuit switches rapidly from one state with the transistor 28 fully off and the transistor 25 fully on, to another state with the transistor 25 fully off and the transistor 28 fully on. The current flowing through the Zener diode 24 determines the periods of conduction of the transistors 25 and 28, to produce a mean current flow in the winding 29 sufficient to maintain a regulated voltage supply to the battery 12.

Figure 2:
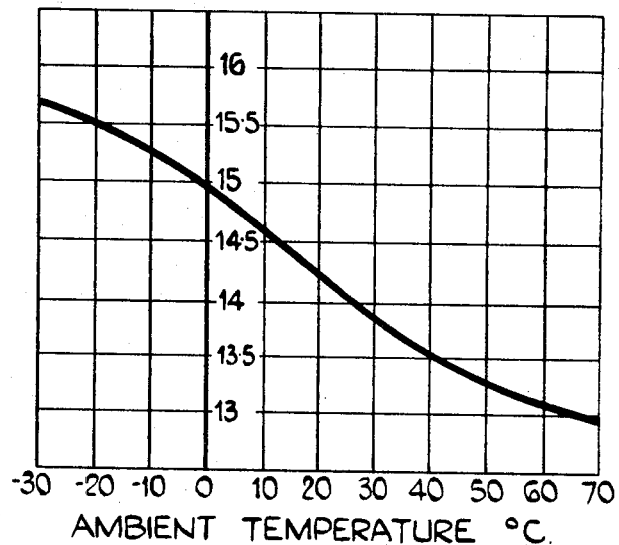
FIG. 2 shows a voltage-temperature curve obtained in the prior art, assuming an output current of five amps.
Figure 3:
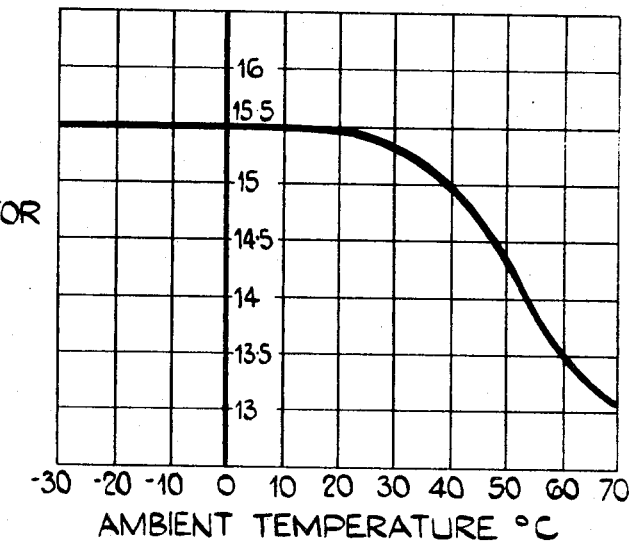
FIG. 3 shows a similar curve obtained using the circuit shown in FIG. 1.

Although the Zener diode 24 always conducts when a predetermined voltage is applied across it, the alternator output voltage at which the Zener diode 24 conducts is determined by the thermistor 21 and resistors 22 and 23. In the prior art, the transistor 43 and resistors 41, 42 are not provided. Ignoring these components for the moment, and assuming that the thermistor 21 is positioned close to the battery, then when the battery is cold, the thermistor 21 will have a relatively high resistance value and there will be a substantial voltage drop across it. As the battery becomes warmer, the thermistor 21 also becomes warmer and its resistance value decreases, so that the voltage drop across it also decreases. It will be appreciated that the alternator voltage at which the Zener diode 24 starts to conduct will be increased by the voltage drop across the thermistor 21, and in practice a curve of the form shown in FIG. 2 will be obtained. As will be seen from this curve, the operating voltage decreases with battery temperature, but unfortunately under some circumstances this may not be a satisfactory characteristic for regulating the voltage applied to a vehicle battery. For this reason the resistors 41, 42 and transistor 43 are incorporated. Using this arrangement then when the thermistor is hot it will have a low resistance value and most of the current will flow through it. In these circumstances the Zener diode 24 conducts when the voltage on line 15 reaches a relatively low value. However, when the thermistor is cold it will have a relatively high resistance value, and current will now flow through the resistor 41 to turn on the transistor 43, which will then conduct thus limiting the increase in voltage on line 15. The effect of this will be to produce a curve as shown in FIG. 3 will be obtained, which in certain circumstances, is a much more suitable curve for use with a vehicle battery. The exact form of the curve can of course be altered by varying the resistances of resistors 41 and 42.

Having thus described my invention what I claim as new and desire to secure by Letters Patent is:

1. A voltage regulator for use in a battery charging system, including an input transistor, an output transistor which in use controls current flow in the field winding of a generator charging a battery, means coupling the input and output transistors whereby the input transistor controls conduction of the output transistor, a resistance chain for sensing the output voltage of the generator in use a Zener diode connected to the resistance chain so asto conduct at a predetermined voltage, the Zener diode controlling conduction of the input transistor, said resistance chain including a thermistor for providing temperature compensation, and the thermistor being bridged by the collector-emitter path of a further transistor, the regulator further including biasing means responsive to said thermistor for controlling the base voltage of said further transistor so that the regulated voltage varies with temperature in a predetermined manner.

2. A regulator as claimed in claim 4 in which said biasing means turns the transistor on when the thermistor is relatively cold, so that it has a relatively high resistance value, but when the thermistor is relatively hot and has a relatively low resistance value, the transistor is substantially non-conductive so that most of the current flows through the thermistor.

3. A regulator as claimed in claim 4 in which the Zener diode controls the conduction of an input transistor which when conductive removes base current from the output transistor, the input and output transistors being interconnected by a positive feedback circuit so that the transistors oscillate between one state in which the input transistor is fully conductive and the output transistor is off, and another state in which the output transistor is fully conductive and the input transistor is off, the mark-space ratio being determined by the current flowing through the Zener diode.

4. A voltage regulator for use in a battery charging system, including an output transistor which in use controls current flow in the field winding of a generator charging a battery, a resistance chain for sensing the output voltage of the generator in use, a Zener diode connected to the resistance chain so as to conduct at a predetermined voltage, the Zener diode controlling conduction of the output transistor, said resistance chain including a thermistor for providing temperature compensation, and the thermistor being bridged by two parallel paths, the first of which contains the emitter-collector of a further transistor, and the second of which contains first and second resistors in series, the junction of said first and second resistors being connected to the base of said further transistor, and the first and second resistors serving to control the voltage of the base of said further transistor so that the regulated voltage varies with temperature in a predetermined manner.

* * * * *